D. FRASER.
CHAIN FOR CONVEYERS.
APPLICATION FILED NOV. 21, 1916.

1,281,934.

Patented Oct. 15, 1918.

Witnesses
Marshall Low

Inventor
Donald Fraser
By John S. Backer
his Attorney

UNITED STATES PATENT OFFICE.

DONALD FRASER, OF MILWAUKEE, WISCONSIN, ASSIGNOR TO CHAIN BELT COMPANY, OF MILWAUKEE, WISCONSIN, A CORPORATION OF WISCONSIN.

CHAIN FOR CONVEYERS.

1,281,934. Specification of Letters Patent. Patented Oct. 15, 1918.

Application filed November 21, 1916. Serial No. 132,606.

*To all whom it may concern:*

Be it known that I, DONALD FRASER, a citizen of the United States, residing at Milwaukee, in the county of Milwaukee and State of Wisconsin, have invented certain new and useful Improvements in Chains for Conveyers, of which the following is a specification.

My invention relates to chains for conveyers and has for its object to provide links that will serve both as parts of such chain and also as supports for flights, buckets, or other supporting and transporting elements.

Referring to the drawings—

Figure 1:
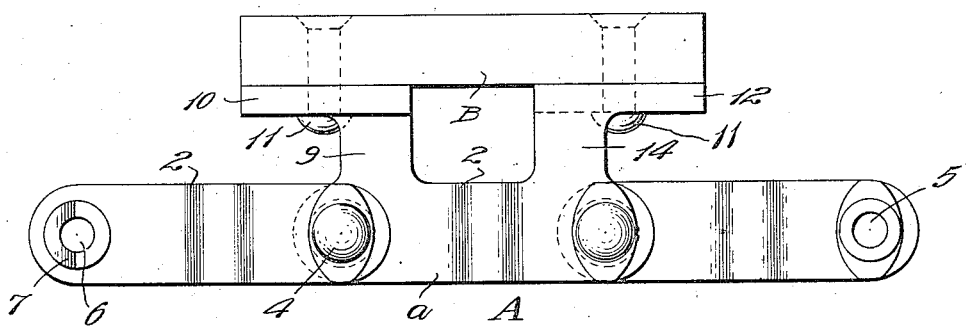
Figure 1 is a side elevation of a short section of a conveyer embodying my invention.
Figure 2:
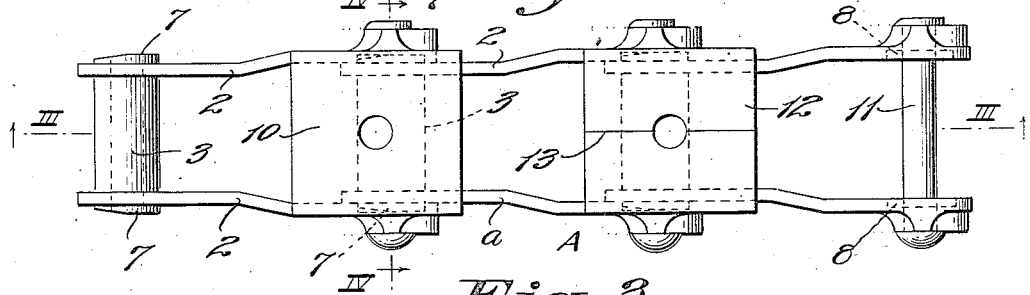
Fig. 2 is a top plan view of the same, the cross flight element of the conveyer shown in Fig. 1 being omitted.
Figure 3:
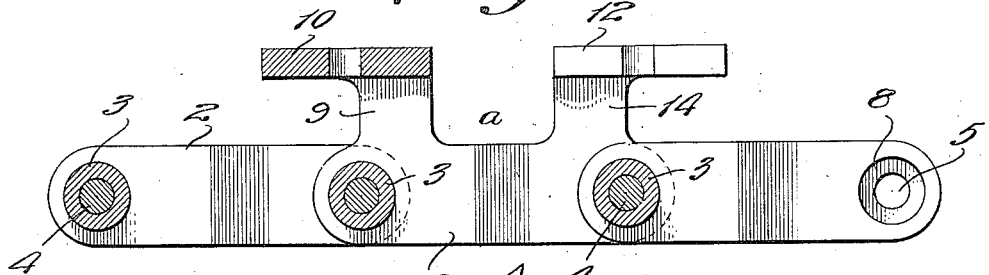
Fig. 3 is a longitudinal sectional view taken on the line III—III of Fig. 2.

In the drawings A represents a drive and power transmitting chain, and B a material-supporting and conveying element carried by certain of the links of the chain. This conveying element is typified by a cross slat or flight, though other devices, such as buckets, pans, and the like, might be used. In the drawings but a single line of chain is represented, and this would be sufficient to support and carry many forms of conveying and transporting devices. But for supporting cross slats of considerable length two or more lines of parallel chain would be employed. These features thus far referred to are so well known in the art as not to require illustration to be understood, and therefore are merely herein referred to.

The chain A is formed of a series of articulated links each consisting of two side bars 2, 2, and a hollow end bar 3 between the side bars, at one end of the link. Preferably these parts are integral, each link being of substantially U-shape. When united into a chain the side bars of each link overlap the end bar of an adjacent link, and a pintle 4, passing through the perforations 5 in the side bars and the perforation 6 in the end bar, unites them. In the form of chain illustrated there are short hubs or bosses 7, 7 in line with the end bars of the links, and these are adapted to occupy recesses 8, shaped to receive them and formed in the inner faces of the ends of the side bars 2, such recesses being concentric with the perforations 5. The advantages of this form of chain are well understood to those skilled in the art and need not be here set out.

In uniting the links of the chain the free ends of the side bars are sprung apart sufficiently to permit them to be slipped over the bosses 7, and are afterward drawn together and united by the pintle 4. The special link constituting my present invention is designated *a*, and as stated, not only forms a part of the chain A, but also serves as a support for the slat B or other supporting and transporting element of the conveyer. As many of these links *a* are employed as may be required. Thus every alternate link could be of this kind, or a less number could be employed as might be required. Each link *a* is formed with a pair of side bars 2 and an end bar 3 and with hubs or bosses 7, such as have already been described.

Extending upwardly from the cross-bar 2 of the link *a* (considering the chain as occupying the position indicated in the drawings) is a web 9, carrying at its upper end a horizontal plate 10 on which is supported the flight B, the flight being secured to the plate by a bolt 11. At the other end of the link is a divided supporting plate 12, preferably located in the same plane as the plate 10, upon which rests, and to which is secured, as by bolts 11, the flight B. The plate 12 is formed of two parts, their inner ends preferably coming close together as indicated at 13. Each section of the supporting plate 12 is connected with a side bar of the link *a* by a web 14 that lies approximately in the vertical plane of the side bar to which it is united.

Figure 4:
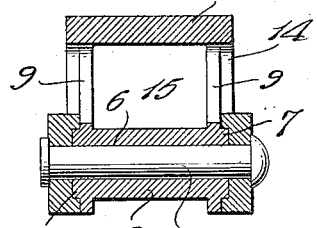
Fig. 4 is a transverse sectional view taken on the line IV—IV of Fig. 2.
Figure 5:
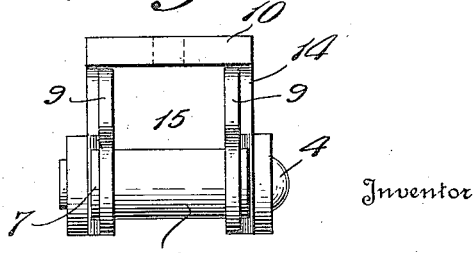
Fig. 5 is an end view of one of the links *a* detached.

It will be seen by reference to Fig. 4 that there is an open space 15 over the end bar 3 of the link that is united to the link *a*, and below the inner portion of the divided supporting plate 12. This permits free articulation of the links. By dividing the supporting plate 12 it is entirely feasible to spread apart the ends of the side bars 2 to permit them to pass over and become engaged with the bosses or hubs 7 of the link with which the chain link *a* is to be united. At the same time, by means of my invention, the flight or conveying element carried by the chain is supported in the line of the chain and well above the plane of the articulating parts thereof.

I am aware that drive, power-transmitting, and conveyer chains, more or less similar to that represented in the drawings, have been provided with attachments of various kinds by which flights, buckets, and other transporting elements of a conveyer could be united to the chain. In some instances these attachments consisted of wings extending laterally outward from the side bars of the chain, while in other cases they consisted of box-like supports uniting the cross-bars of the chain links between their ends. The former construction is undesirable under some circumstances in that it carries the points of support and attachment for the conveying elements laterally outside of the line of the chain, while the second arrangement makes the link so rigid in construction that the free ends of the side bars cannot be spread apart for uniting the links in the manner herein described. My present invention overcomes the objections incident to both the constructions referred to in that the flights or other transporting elements of the conveyer are supported directly over the chain, that is, the supporting plates 10 and 12 are entirely within the transverse limits of the chain, while the attachments do not in any way make it impossible or unduly difficult to spread the free ends of the side bars to cause them to pass over the hubs at the ends of the cross-bars in the act of coupling together, or separating, the links.

It will be seen that the supporting plates 10 and 12 are carried by the ends of the link and extend, in opposite directions, beyond such chain link ends, so that they lie above the adjacent links, thus giving a bearing or seat for the transporting element of the conveyer of considerable dimensions in the direction of the length of the chain; and that this is secured without the necessity of using a long link for carrying the supports 10 and 12.

What I claim is:—

1. A link for a power transmitting chain, having side bars and a cross-bar uniting said bars and integral therewith, carrying at its end that is opposite the connecting end bar a divided plate adapted to support a transporting element of a conveyer, the said plate lying within the transverse limits of the chain and its parts being supported respectively by the free ends of the side bars.

2. A link for a power transmitting chain having side bars adapted to be united with the side bars of another link and carrying at one of its ends a divided plate adapted to support a transporting element of a conveyer, the said plate being located above the plane of the chain and extending beyond the end of the link so as to overlie an adjacent connected link, the parts of said plate being supported respectively by the free ends of the side bars of the link that are adapted to be coupled with the adjacent link of the chain.

3. A link for a power transmitting chain having side bars united at one end by a cross bar that is integral therewith, the opposite ends of the side bars being free and adapted to overlie the side bars of an adjacent link to which they are articulated, the free ends of the side bars carrying a divided plate adapted to support a transporting element of a conveyer, the parts of said plate extending transversely inwardly toward each other and also longitudinally beyond that end of the link to which they are united and being situated in a plane above the side bars.

4. A link adapted to constitute part of a power transmitting chain, having side bars and a cross-bar integral therewith and uniting the side bars at one end of the link, the opposite, free, ends of the side bars being adapted to overlie an adjacent link to which they are articulated, the said link being provided at its ends with plates adapted to support the transporting element of a conveyer, one of the said plates being carried by the end bar of the link, and the other plate being divided and its parts carried respectively by the free ends of the side bars, and the said plates being located above the plane of the chain and within the transverse limits thereof.

DONALD FRASER.